(12) United States Patent
Dahl et al.

(10) Patent No.: US 10,532,651 B2
(45) Date of Patent: Jan. 14, 2020

(54) MOTOR VEHICLE HAVING AN AIR GUIDE AND AN AIR DUCT

(71) Applicant: Dr. Ing. h.c. F. Porsche Aktiengesellschaft, Stuttgart (DE)

(72) Inventors: Benno Dahl, Stuttgart (DE); Tobias Hegedusch, Schwieberdingen (DE); Roland-Gerhard Stromsky, Freiberg (DE); Thomas Wolf, Leonberg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 16/033,254

(22) Filed: Jul. 12, 2018

(65) Prior Publication Data

US 2019/0061514 A1 Feb. 28, 2019

(30) Foreign Application Priority Data

Aug. 29, 2017 (DE) .......................... 10 2017 119 829

(51) Int. Cl.
*B60K 11/08* (2006.01)
*B01D 45/04* (2006.01)
*B60H 1/00* (2006.01)

(52) U.S. Cl.
CPC .............. *B60K 11/08* (2013.01); *B01D 45/04* (2013.01); *B60H 1/00564* (2013.01)

(58) Field of Classification Search
CPC ........................... B60K 11/08; B60H 1/00564

USPC ........................................................ 180/68.1
See application file for complete search history.

(56) References Cited

U.S. PATENT DOCUMENTS

| 6,955,394 | B1 * | 10/2005 | Reddig ................ B62D 25/142 |
| | | | 296/193.02 |
| 8,127,878 | B2 | 3/2012 | Teraguchi et al. |
| 2005/0230162 | A1 | 10/2005 | Murayama et al. |
| 2006/0006012 | A1 | 1/2006 | Khouw et al. |
| 2010/0032220 | A1 | 2/2010 | Ohira et al. |
| 2012/0048632 | A1 | 3/2012 | Mehlos et al. |
| 2012/0111653 | A1 | 5/2012 | Stuckey |
| 2012/0211293 | A1 | 8/2012 | Leanza et al. |
| 2017/0057337 | A1 * | 3/2017 | Kunimasa ............. B60K 11/04 |
| 2017/0328317 | A1 | 11/2017 | Wadi et al. |

FOREIGN PATENT DOCUMENTS

| DE | 102004034313 A1 | 2/2006 |
| DE | 102014004947 A1 | 11/2014 |
| DE | 102014220000 A1 * | 4/2016 ............. B62D 35/02 |
| DE | 102016214511 A1 | 3/2017 |
| DE | 202017102644 U1 | 5/2017 |

* cited by examiner

*Primary Examiner* — Paul N Dickson
*Assistant Examiner* — Hilary L Johns
(74) *Attorney, Agent, or Firm* — Leydig, Voit & Mayer, Ltd.

(57) ABSTRACT

A motor vehicle includes air-guiding means and an air duct. The air-guiding means are configured to guide incident air into the air duct. The air-guiding means are arranged such that the incident air flows from below into a first end section of the air-guiding means during an intended use of the motor vehicle.

7 Claims, 3 Drawing Sheets

MOTOR VEHICLE HAVING AN AIR GUIDE AND AN AIR DUCT

CROSS REFERENCE TO RELATED APPLICATIONS

This application claims benefit to German Patent Application No. DE 10 2017 119 829.6, filed Aug. 29, 2017, which is hereby incorporated by reference herein.

FIELD

The present invention relates to a motor vehicle having air-guiding means and an air duct.

BACKGROUND

When a motor vehicle is traveling, the incident air is used by the motor vehicle for cooling purposes and for ventilating the interior space. The air enters the motor vehicle at a front side of the motor vehicle and is directed into an air duct via air-guiding means.

The incident air can contain impurities such as dust, water and/or snow which, during the use of said air in the motor vehicle, are a disadvantage and can cause damage. In order to reduce the risk of damage and impurities, U.S. Pat. No. 8,127,878 B2 proposes air-guiding means in the case of which the incident air is diverted such that impurities are removed from the air prior to the latter entering the air duct. During the diversion of the incident air, it is often the case that the air resistance of the motor vehicle is changed too.

SUMMARY

In an embodiment, the present invention provides a motor vehicle including an air guide and an air duct. The air guide is configured to guide incident air into the air duct. The air guide is arranged such that the incident air flows from below into a first end section of the air guide during a use of the motor vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
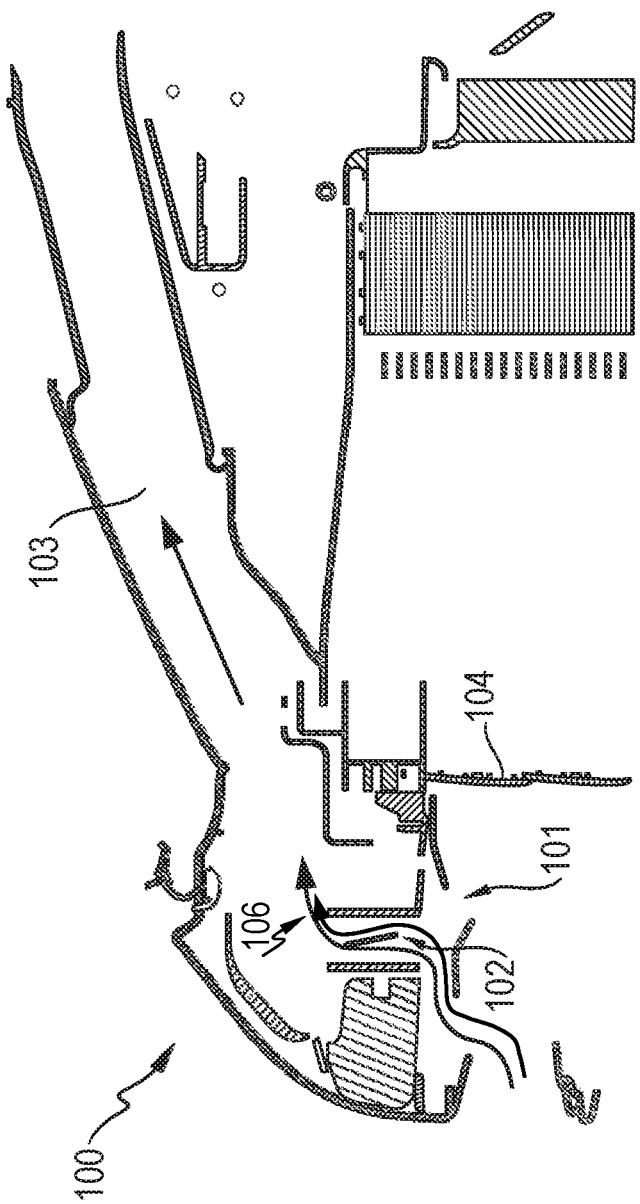
FIG. 1 shows a schematic sectional illustration of a detail of a motor vehicle according to one embodiment of the invention.
Figure 2:
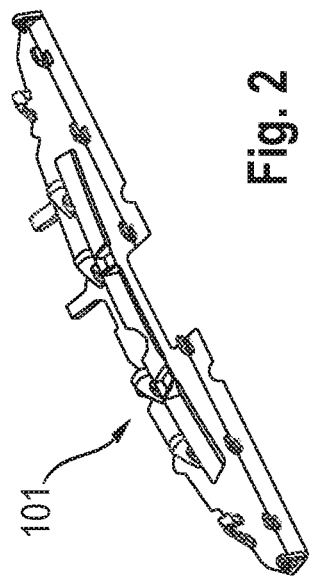
FIG. 2 shows a schematic perspective view of a first component of air-guiding means.
Figure 3:
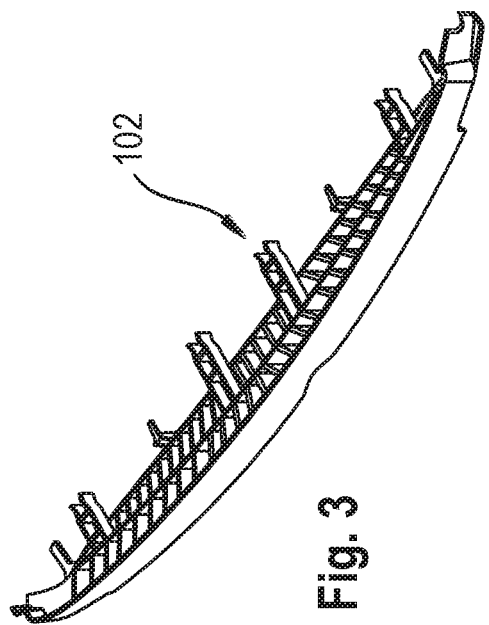
FIG. 3 shows a schematic perspective view of a second component of air-guiding means.
Figure 4:
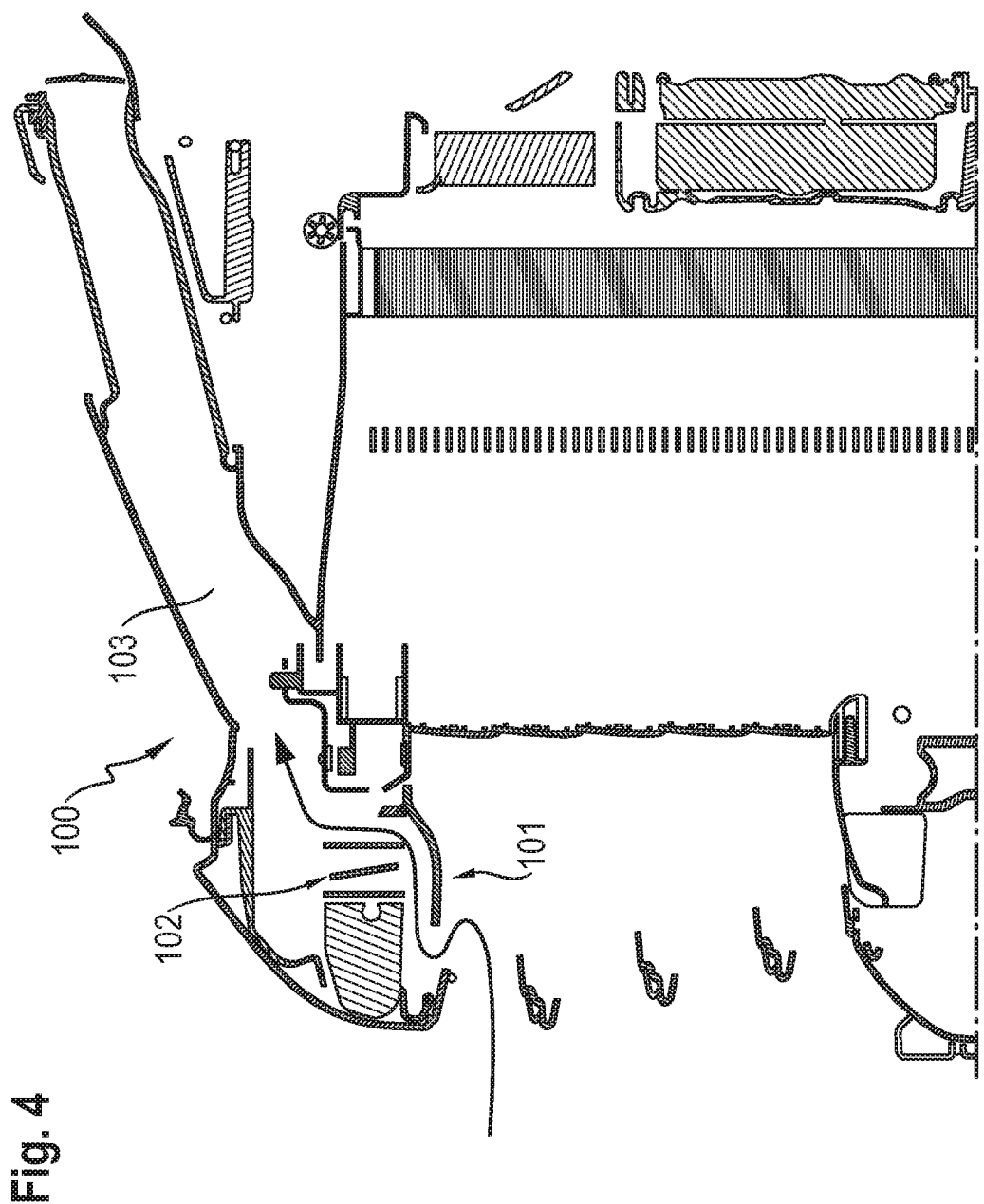
FIG. 4 shows a schematic sectional illustration of a detail of a motor vehicle according to one embodiment of the invention.
Figure 5:
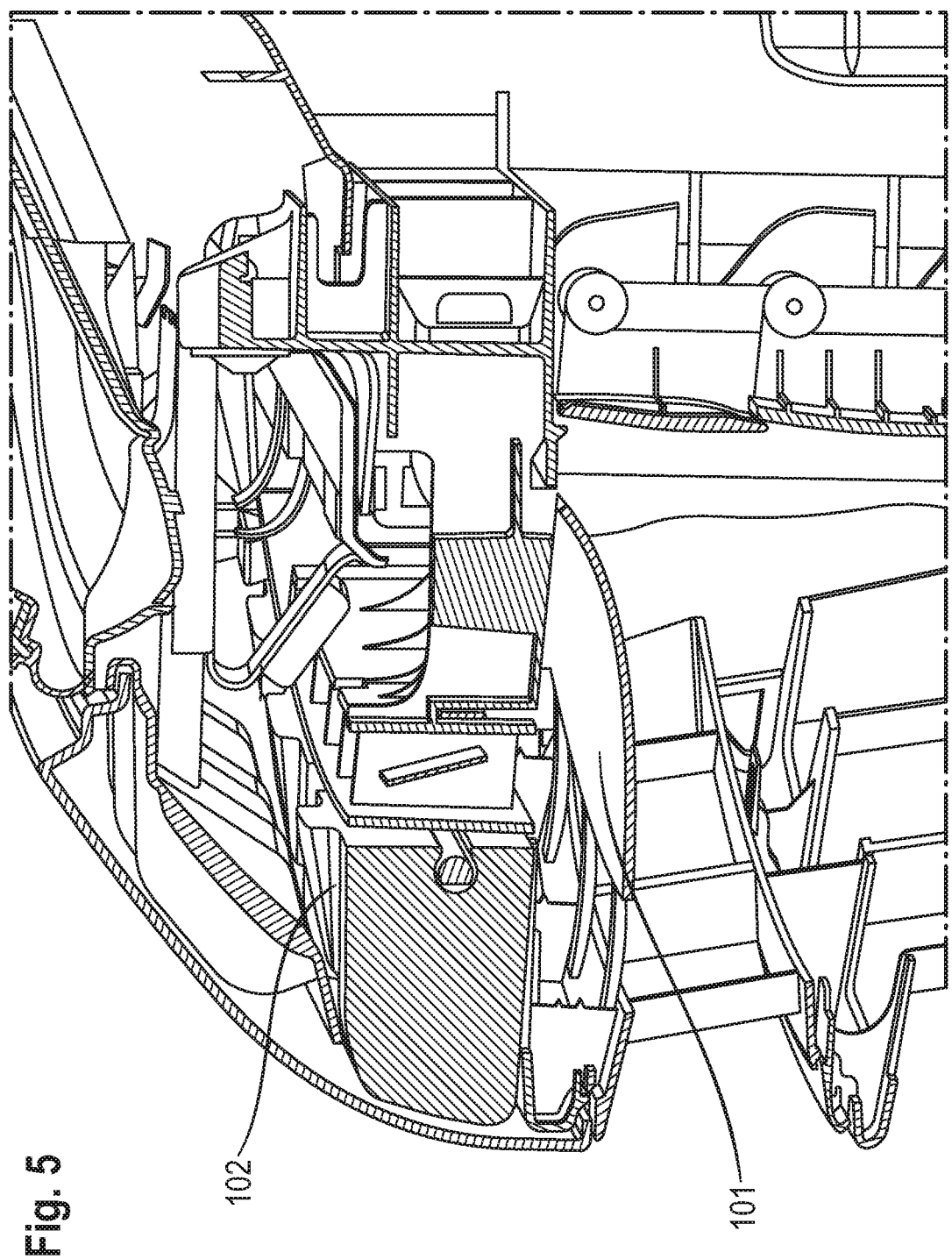
FIG. 5 shows a schematic sectional illustration of a detail of a motor vehicle according to one embodiment of the invention.

Embodiments of the invention provide for effective removal of the impurities from incident air at a relatively low air resistance.

According to an embodiment of the invention, a motor vehicle includes air-guiding means and an air duct. The air-guiding means are designed to guide incident air into the air duct. Within the context of this description, "the incident air" can be understood to mean in particular the air which flows to the front side of the motor vehicle during forward travel of the motor vehicle.

Within the context of this description, "air-guiding means" can be understood to mean in particular means which are designed to divert the incident air. A component which, for example, does not divert the incident air, is not, within the context of this description, intended to be understood as being an air-guiding means.

During the intended use of the motor vehicle, the incident air flows from below into a first end section of the air-guiding means. Within the context of this description, "the first end section" can be understood to mean the section at which the incident air flows into the air-guiding means. The inflow of the incident air into the air-guiding means from below results in the air resistance of the motor vehicle being reduced in comparison with an inflow at the front end.

According to one embodiment of the invention, the first end section may be arranged such that it is flowed through in an at least substantially horizontal direction by the air flowing to the air duct. Within the context of this description, the term "at least substantially" can be understood to mean in particular that this is the general direction of the flowing air, although small other directional components may be present due to swirling. For example, more than 70% of the air stream may be realized in said direction. It is also possible that the air flowing to the air duct flows through the first end section in a horizontal direction.

According to one embodiment of the invention, the first end section may be adjoined by a middle section of the air-guiding means. The middle section may be arranged such that it is flowed through in an at least substantially vertical direction by the air flowing to the air duct. It is also possible that the air flowing to the air duct flows through the middle section in a vertical direction.

Owing to the vertical flow through the middle section and the horizontal flow through the first end section, any impurities which are present in the air are removed particularly effectively.

According to one embodiment of the invention, the air-guiding means may have a second end section which adjoins the middle section and which is arranged such that it is flowed through at least substantially in a horizontal direction by the air flowing to the air duct. It is also possible that the air flowing to the air duct flows through the second end section in a horizontal direction.

Owing to the vertical flow through the middle section and the horizontal flow through the second end section, any impurities which are present in the air are removed particularly effectively.

According to one embodiment of the invention, the air duct may be arranged so as to directly adjoin the second end section of the air-guiding means.

According to one embodiment of the invention, the air-guiding means and the air duct are arranged such that the incident air can flow into the air duct exclusively through the air-guiding means. This is advantageous since impurities are thus removed from the entire air stream.

According to one embodiment of the invention, the air-guiding means and the air duct are arranged such that the incident air can flow into the air duct exclusively through the first end section, the middle section and the second end section. This is advantageous since impurities are thereby removed from the entire air stream.

According to one embodiment of the invention, the air-guiding means include at least a first component and a second component. The first end section may be defined at least partially by the first component, and the middle section may be defined at least partially by the second component.

According to one embodiment of the invention, the second component is designed as a crossmember of a body of the motor vehicle. Said crossmember may be designed in particular as a crossmember which performs a function for protecting pedestrians in the event of a collision of the motor vehicle with pedestrians. Said crossmember may be used therefore both for the protection of pedestrians and as a constituent part of the air-guiding means.

The motor vehicle 100 comprises a first component 101 and a second component 102, which together define the air-guiding means. In FIG. 1, the stream of the incident air during the intended use of the motor vehicle 100 is illustrated by arrows. Moreover, the motor vehicle 100 comprises an air duct 103 and a louver 104 which can be opened or closed.

The incident air flows from below into a first end section of the air-guiding means, which section is defined by the first component 101. The air flows through said first end section in a horizontal direction and is subsequently diverted by the air-guiding means into a vertical direction in which it flows through a middle section of the air-guiding means. Said middle section is arranged inside the second component 102. The second component 102 is a crossmember of the motor vehicle 100, which crossmember also serves for protecting pedestrians in the event of a collision. The air passes via a second end section of the air-guiding means, in which section the air again flows in a horizontal direction, into the air duct 103.

As a result of the frequent diversions and changes in direction of the incident, any impurities which are present are reliably removed, with the result that the air entering the air duct 103 is particularly clean.

As already mentioned, the incident air enters the first end section of the air-guiding means from below, through which section it then flows in a horizontal direction. Consequently, a particularly low air resistance of the motor vehicle 100 with at the same time reliable removal of the impurities from the incident air is achieved. As shown in FIG. 1, the second component 102 is formed as a crossmember of a body of the motor vehicle 100 and is configured to receive incident air 106 on two opposing sides.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle comprising:
an air guide; and
an air duct,
wherein the air guide is configured to guide incident air into the air duct, and
wherein the air guide is arranged such that the incident air flows from below into a first end section of the air guide during a use of the motor vehicle, and
wherein the air duct is disposed within the motor vehicle,
wherein the first end section is adjoined by a middle section of the air guide, wherein the middle section is arranged such that the incident air flows therethrough in an at least substantially vertical direction,
wherein the air guide comprises at least a first component and a second component, the first component being separate from the second component,
wherein the first end section is defined at least partially by the first component and the middle section is defined at least partially by the second component being within the middle section, and
wherein the first component is configured to receive the incident air in a horizontal direction and divert the received incident air to a vertical direction to the middle section,
wherein the second component is formed as a crossmember of a body of the motor vehicle and is configured to receive the incident air on two opposing sides.

2. The motor vehicle as claimed in claim 1, wherein the first end section is configured such that the incident air flows therethrough in an at least substantially horizontal direction.

3. The motor vehicle as claimed in claim 1, wherein the air guide includes a second end section which adjoins the middle section and which is arranged such that the incident air flow there through at least substantially in a horizontal direction.

4. The motor vehicle as claimed in claim 3, wherein the air duct is arranged so as to directly adjoin the second end section of the air guide.

5. The motor vehicle as claimed in claim 1, wherein the air guide and the air duct are arranged such that the incident air can flow into the air duct exclusively through the air guide.

6. The motor vehicle as claimed in claim 5, wherein the air guide and the air duct are arranged such that the incident air can flow into the air duct exclusively through the first end section, the middle section and the second end section.

7. The motor vehicle as claimed in claim 1, wherein the air duct is defined, at least in part, by a body panel of the motor vehicle.

* * * * *